Figure 6:
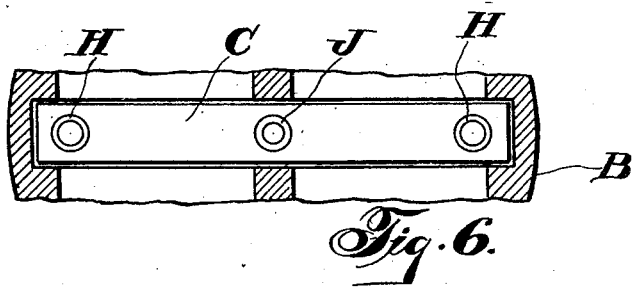

Sept. 7, 1926.  F. VAN D. LONGACRE  1,599,281
PLATE VALVE
Filed Dec. 8, 1925    2 Sheets-Sheet 1
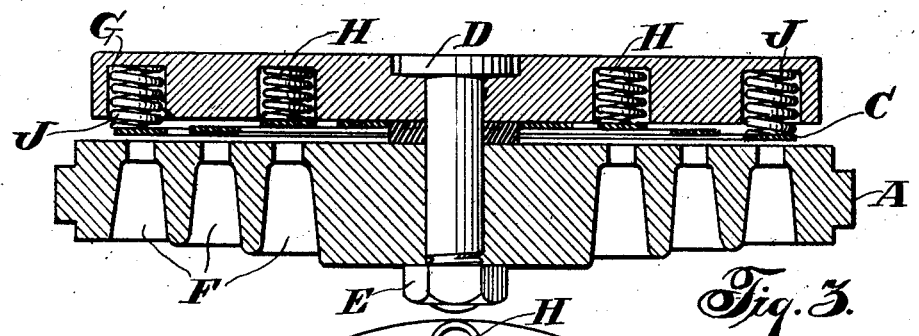
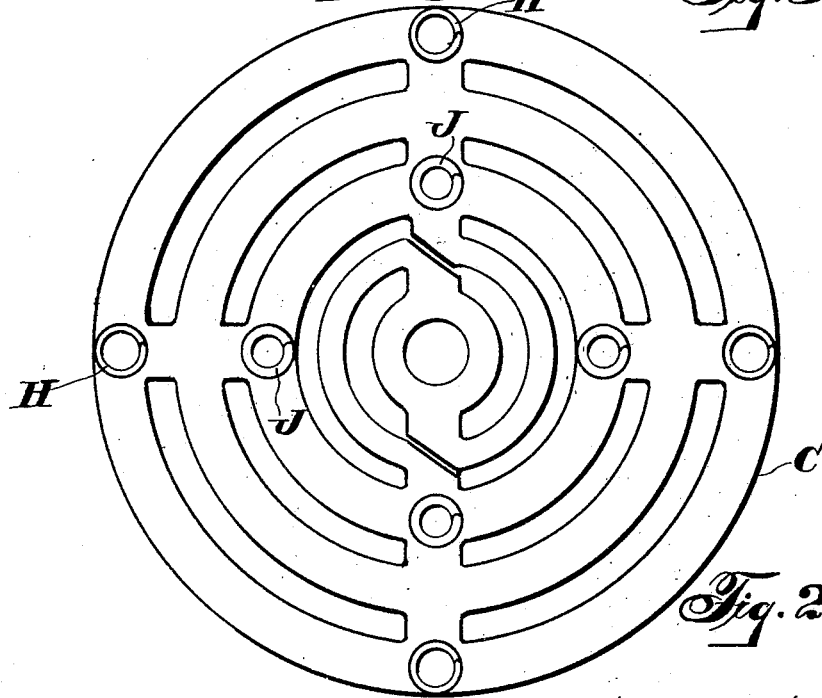
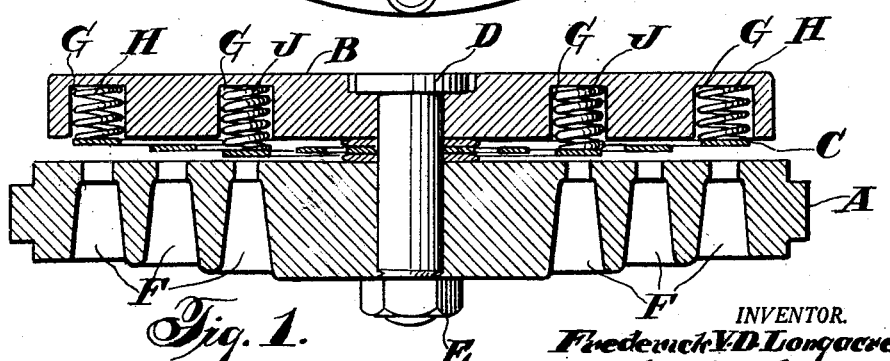
INVENTOR.
Frederick V.D. Longacre
BY Herbert G. Ogden
HIS ATTORNEY Sept. 7, 1926.                F. VAN D. LONGACRE                1,599,281

PLATE VALVE

Filed Dec. 8, 1925          2 Sheets-Sheet 2

INVENTOR.
Frederick V.D.Longacre
BY
HIS ATTORNEY.

Patented Sept. 7, 1926.

1,599,281

UNITED STATES PATENT OFFICE.

FREDERICK VAN DUZER LONGACRE, OF YONKERS, NEW YORK, ASSIGNOR TO INGERSOLL-RAND COMPANY, OF JERSEY CITY, NEW JERSEY, A CORPORATION OF NEW JERSEY.

PLATE VALVE.

Application filed December 8, 1925. Serial No. 74,038.

This invention relates to fluid compressors but more particularly to an improvement in valves for such compressors known to the art as plate valves. In such valves a thin disc or plate is adapted to lie upon ports arranged on a valve seat and the operation of the valve consists in the vertical lift and fall of the disc in relation to the valve seat. Although there are many variations in the design of plate valves, there is one disadvantage which is common to practically all forms, which is the jar or concussion between the valve disc and the valve seat, when the valve is returned to its seat, for this concussion, besides making the operation of the machine noisy, also tends toward breakage of the valve. In practically all types of voluntary valves for air compressors and the like where the movement of the valve is caused by pressure differential, these valves in their actual operation have a degree of freedom of action which causes them to come in contact with their back stops on opening and with their seats on closing in an irregular manner. That is, it is practically impossible to prevent some part of a valve plate from coming in contact with its seat ahead of the rest of the valve plate, and whereas in such a valve no provision is made to cushion the shock of this contact, the durability of the valve is greatly reduced and there is a consequent reduction in the velocity limitations that the valve would be capable of, could this be prevented. Considering the valve as a free agent, controlled by many variations in velocity through the ports and passages it will continue in the great majority of cases to open and close so as to produce the contact at one part of the valve. What I aim to do is to anticipate this movement and to cause it to take place ahead of the extreme velocity action of the valve by the use of differential springing of the valve plate, having heavier springs at one location than at the other so that the valve will close due to spring effect prior to the full drop in pressure where the heavier springs are located and will open prior to the full application of pressure, where the lighter springs are located, thus causing the contact at these locations on closing and opening to occur ahead of time, when the velocity conditions are much lower, whereby the consequent shock is much reduced.

The object of my invention therefore is to eliminate one disadvantage common to all plate valves by adapting the valve to seat at one point in advance of complete seating and thus eliminate the jarring and concussion in its operation which entails this breakage and noise. In this way, whether the valve is circular in form or rectangular, it will ease down upon its seat smoothly and comparatively silently and there is no danger of its being cracked or broken as there is with a valve allowed to seat in a haphazard fashion.

My invention consists in the features of novelty and combination of elements described in the specification, set forth in the appended claim, and illustrated in the drawings in which—

Figure 5:
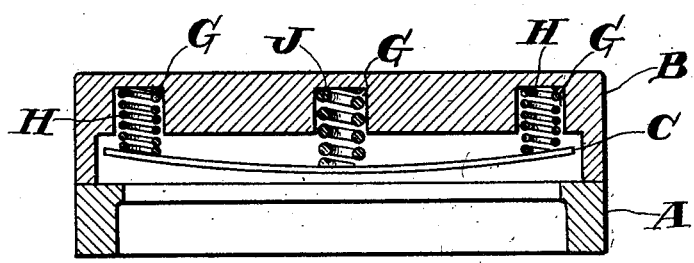
Figure 4:
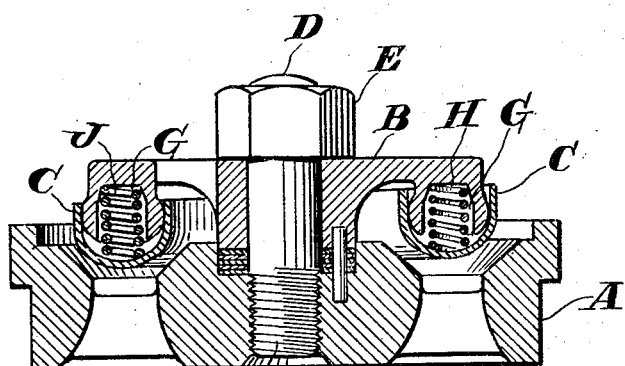

Figure 1 is a transverse elevation of a complete discharge valve assembly showing the valve open, Figure 2 is a horizontal view of the valve disc itself with coil springs of different initial tensions shown properly placed thereon, Figure 3 is a transverse sectional elevation of a modified form of the valve assembly, Figure 4 is a transverse sectional elevation of the valve assembly showing my invention applied to a cup-shaped annular valve plate, Figure 5 is a transverse sectional elevation of a strip valve embodying my invention, while, Figure 6 is a horizontal view of a section of the same strip valve assembly.

Referring to Figures 1 and 2 of the drawings, a valve seat A, stop plate B, and a valve disc C are shown suitably held in relation each to each by means of the valve bolt D and the nut E. The valve seat is provided with three concentric sets of ports F and the valve disc C is adapted to lie over and upon these ports. Recesses G are cut in the stop plate B and are adapted to contain coil springs which will bear upon the valve disc and hold it to its seat. The springs H are placed in the recesses G at the outer circumference of the stop plate while springs J of considerably greater initial tension than the springs H are placed in the recesses G nearer the center of the valve. In this way, the operation of the valve will be such that the compression in the cylinder will force open the outer portions of the valve disc against the small initial tension of the springs H before it will force open the center portions of the valve disc against the greater tension of the springs J and upon its return to the valve seat, the valve will seat beneath the springs J before its outer extremities seat beneath the springs H.

In Figure 3 the same valve assembly as in Figure 1 is shown except that the springs have been reversed and as a result, in this case, the valve will seat in operation at its outer circumference before it will seat nearer its center. In Figure 4 the usual valve assembly is shown in which a semi-tubular ring or cup-shaped form of valve is used, and the heavy springs J are placed on one side of the valve while the light springs H are placed on the diametrically opposite side with a result that the valve will rock down upon its seat with that part of the valve beneath the heavier springs J seating first.

Figures 5 and 6 show my invention as applied to the so-called strip valve in which a thin rectangular and resilient strip C, used as the valve proper, seats upon the valve seat A, and is held in place by the back stop B, the two outer and lighter springs H and the central heavy spring J. As a result the central portion of the valve beneath the heavy spring J will seat before its extremities beneath the lighter springs H.

My invention is not to be confined merely to the exact form described in my specification or shown in the drawings as it is very evident that one skilled in the art could devise various means for applying it according to the circumstances involved.

I claim:—

An improvement in plate valves for fluid compressors comprising a valve plate, a stop plate, a bolt holding said elements in proper relation each to each, pockets in the said stop plate, and coil springs in said pockets adapted to bear upon and hold the valve upon its seat, the initial tension of said coil springs being unequal and so arranged that a part or parts of the valve plate will seat in advance of its complete seating.

In testimony whereof I have signed this specification.

FREDERICK van DUZER LONGACRE.